United States Patent [19]

Matsui

[11] Patent Number: 4,938,625

[45] Date of Patent: Jul. 3, 1990

[54] ASSEMBLING DEVICE

[75] Inventor: Kazuhiro Matsui, Aichi, Japan

[73] Assignee: Kabushiki Kaisha Kojima Shohten, Tokyo, Japan; a part interest

[21] Appl. No.: 393,403

[22] Filed: Aug. 11, 1989

[30] Foreign Application Priority Data

Aug. 30, 1988 [JP] Japan ................... 63-215491

[51] Int. Cl.⁵ .................................... B25G 3/00
[52] U.S. Cl. .................... 403/231; 403/407.1
[58] Field of Search ............... 403/407.1, 231

[56] References Cited

U.S. PATENT DOCUMENTS

| 4,345,849 | 8/1982 | Stenemann . | |
| 4,549,831 | 10/1985 | Lautenschlager | 403/231 |
| 4,582,446 | 4/1986 | Salice . | |
| 4,664,548 | 5/1987 | Brinkmann | 403/407.1 X |
| 4,693,630 | 9/1987 | Giovannetti | 403/405.1 |

4,787,769 11/1988 Michael .

FOREIGN PATENT DOCUMENTS 2546751 4/1977 Fed. Rep. of Germany .

Primary Examiner—Andrew V. Kundrat
Attorney, Agent, or Firm—Flynn, Thiel, Boutell & Tanis

[57] ABSTRACT

A device for assembling furniture or the like includes a main case adapted to be mounted on a base panel, a cam rotatably disposed within the main case, and a retaining member. The cam is disposed for eccentric rotation relative to a rotary shaft. The retaining member includes at one end a retaining portion adapted to press a work panel against the base panel, and at the other end an engaging portion for slidably engaging a cylindrical outer surface of the cam. Rotation of the cam causes reciprocal movement of the retaining member, allowing the retaining portion to engage and disengage the work panel for respectively pressing it against the base panel.

6 Claims, 5 Drawing Sheets

ASSEMBLING DEVICE

FIELD OF THE INVENTION

This invention relates to an assembling device for assembling a base material and a material-to-be-fixed, and particularly to an assembling device which is effective for assembling a side panel and a rear panel of a furniture article or the like.

BACKGROUND OF THE INVENTION

The subject matter of this application is related to the disclosure of pending U.S. Ser. No. 07/294 763.

Heretofore, in assembling panel materials such as a side panel and a rear panel of an article of furniture or the like, which panels are perpendicular to each other, the two panels have been secured using nails or bolts, for example, and then assembled. However, when nails are used, the panel materials sometimes absorb moisture. In view of the foregoing, there also was proposed a device in which a side panel, a top panel and a bottom panel forming a framework of the furniture article were each provided with a groove for permitting a rear panel to be inserted therein. In this case, the rear panel was simply inserted into the groove and the framework was assembled by being fixed with screws.

However, in recent years, more and more compression plywoods and veneer sheets have been used as furniture materials instead of natural wood. These furniture materials have shortcomings such as being weak and easy to break when, for example, screws are tightened too much. Also, when such veneer sheets are secured by screws, the screw holes are easily broken and the screws are easily loosened or come out. In addition, after the mounting position of a rear panel is secured, it is difficult to correct if necessary.

Similarly, the conventional device having a groove for insertion has shortcomings in that the rear panel tends to become loose and rattle since it is not secured to the side panels, etc. This is particularly serious for a stereo rack, for example, because if the rear panel becomes loose and rattles easily, unpleasant vibration noise will bother the listener during his or her listening to music. In addition, there are also involved shortcomings in that the rear panel merely functions as an ornament and if, for example, a force should be applied to such, the framework is crushed down at angles, and the framework will easily be deformed and thus the furniture will easily collapse.

Thus, there is a demand for development of an assembling device with which a rear panel and a side panel, for example, can be rigidly assembled with ease which allows the mounting position of the rear panel to be easily corrected, and with which collapsing of the furniture and generation of noise can be prevented.

Therefore, the construction of this invention is employed in an attempt to solve the above problems. That is, the subject matter of the present invention is an assembling device including:

a main case which is to be mounted on a base material, a cam rotatably disposed within said main case and having a cylindrical outer surface which is eccentric with a rotary shaft, and a retaining member having at one end thereof an engaging portion for engaging with the cylindrical outer surface of the cam and at the other end thereof a retaining portion adapted to retain a material-to-be-fixed (hereinafter referred to as the work material). The retaining member is reciprocally movable according to rotation of the cam and projects from and retracts into the main body. Rotation of the cam causes the work material to be retained by the retaining member so that the work material and the base material will be clamped or pressed together.

An assembling device according to the present invention is mounted on a base material first. Then, a cam is rotated to move a retaining member. By rotating the cam until the retaining portion of the retaining member is brought into abutment against one surface of the work material to apply a pressure thereto, the other surface of the work material is brought into abutment against the base material or the main case to apply a pressure thereto. As a result, the work material is held between the retaining portion and the base material or the work material is held between the retaining portion and the main case and intimately joined. As a result, the base material and the work material are rigidly assembled.

DETAILED DESCRIPTION

One embodiment of the present invention will now be described with reference to the accompanying drawings.

Figure 1:
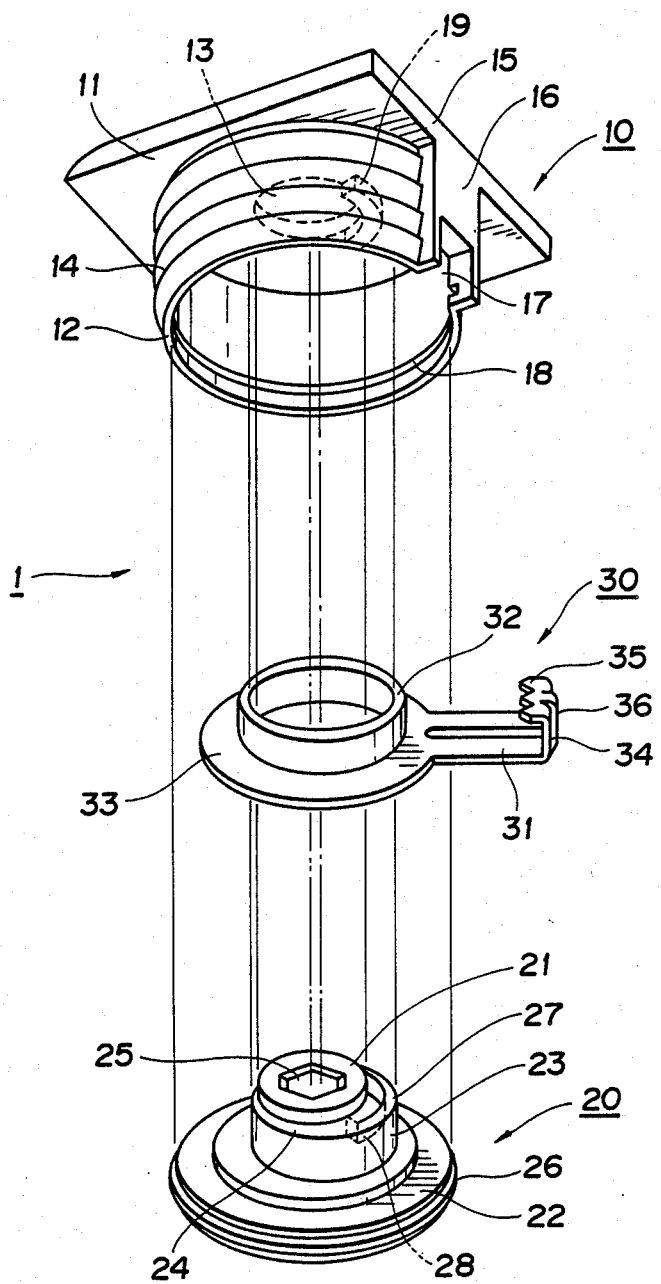
FIG. 1 is an exploded perspective view of an assembling device according to one embodiment of the invention.

As is shown in FIG. 1, an assembling device 1 comprises a main case 10 and a cam 20 made of synthetic resin (i.e. plastic) and a retaining member 30 made of metal.

Figure 3A:
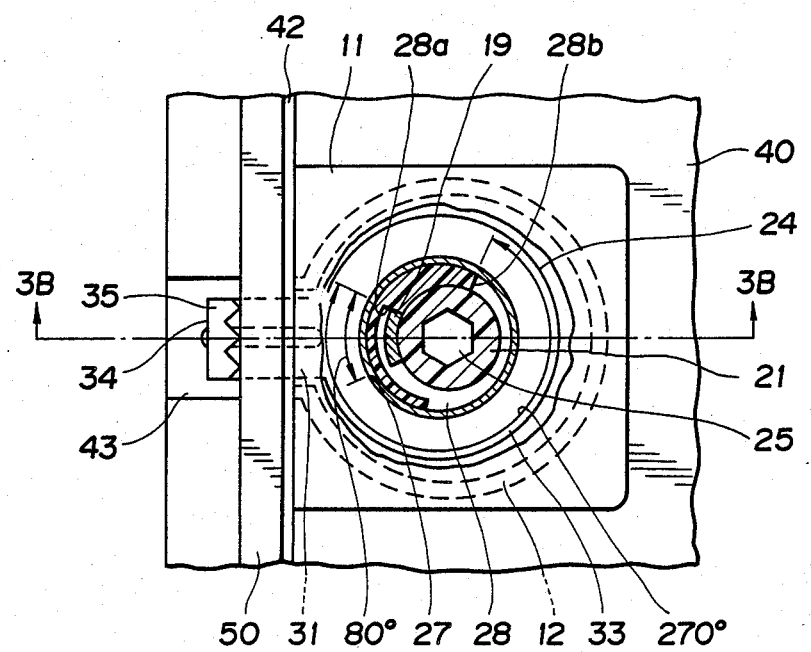
FIG. 3A is a partially sectioned view of the inventive assembling device in position prior to fixing a work material to a base material.
Figure 3B:
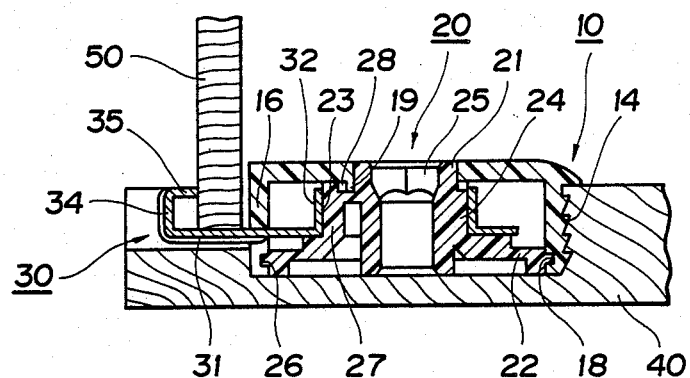
FIG. 3B is a sectional view taken along the line 3B—3B in FIG. 3A.

The main case 10 comprises a rectangular platelike top panel 11 and an annular cylindrical case 12 projecting from the lower surface of the top panel 11. The top panel 11 is provided with a circular hole 13 formed on the same center axis as the cylindrical case 12 and adapted to permit a rotary shaft 21 of the cam 20 to be loose-fitted therein. Also, the cylindrical case 12 is provided on its outer surface with a stepped retaining portion 14 having a serrated configuration as shown in FIG. 3B. Furthermore, the top panel 11 is provided on its lower surface, at the center of one side edge 15, with a rectangular parallelepiped projection 16. The projection 16 extends along the side of the case 12 and is provided in its lower portion with a cut-out portion or recess 17 for permitting an arm portion 31 of the retaining member 30 to be reciprocally moved therethrough. The cylindrical case 12 has formed in an inner surface of its lower portion an engaging groove 18 for permitting the cam 20 to be engaged therein. Furthermore, the top panel 11 has on its lower surface a lug 19 extending for a predetermined extent around the circumferential periphery of the circular hole 13 on the side thereof nearest the projection 16. In this embodiment, the lug 19 has an arcuate configuration forming a center angle of approximately 80° about the centerline 3B—3B as shown in FIG. 3A.

The cam 20 includes a rotary shaft 21, a disk 22 formed around the rotary shaft 21 at its lower end, and an eccentric cam portion 24 (or cam body) formed around the rotary shaft above the disk 22 and having a cylindrical outer surface 23 which is eccentrically movable with respect to the rotary shaft 21. The rotary shaft 21 is formed in its upper end face with a hexagonal hole 25 into which a hexagonal wrench can be inserted. Also, the disk 22 is provided with an engaging ring 26 projecting from the peripheral surface thereof and adapted to engage in the engaging groove 18 in the cylindrical case 12. Furthermore, as is shown in FIG. 3A, the eccentric cam portion 24 is provided on its upper portion with a stepped groove 28 along the rotary shaft 21, so that when the cam 20 is received in the main case 10, the lug 19 will be accommodated in the stepped groove 28. In this embodiment, the stepped groove 28 extends around the peripheral wall of the rotary shaft 21 through about 270°.

The retaining member 30 includes a platelike ring portion 33 provided at its inner edge with an upstanding annular cylindrical engaging portion 32 defining an opening into which the eccentric cam portion 24 can be inserted, a plate-shaped arm portion 31 projecting in the radial direction from a predetermined position on the outer periphery of the ring portion 33, and a retaining portion 34 which is formed by bending the free end of the arm portion 31 perpendicularly upwardly. The free end of the retaining portion 34 further includes a serrated claw 35 bent at a right angle so as to extend toward the engaging portion 32. The arm portion 31 and the retaining portion 34 have on their centerlines a reinforcing rib 36 formed by pressing.

Figure 4A:
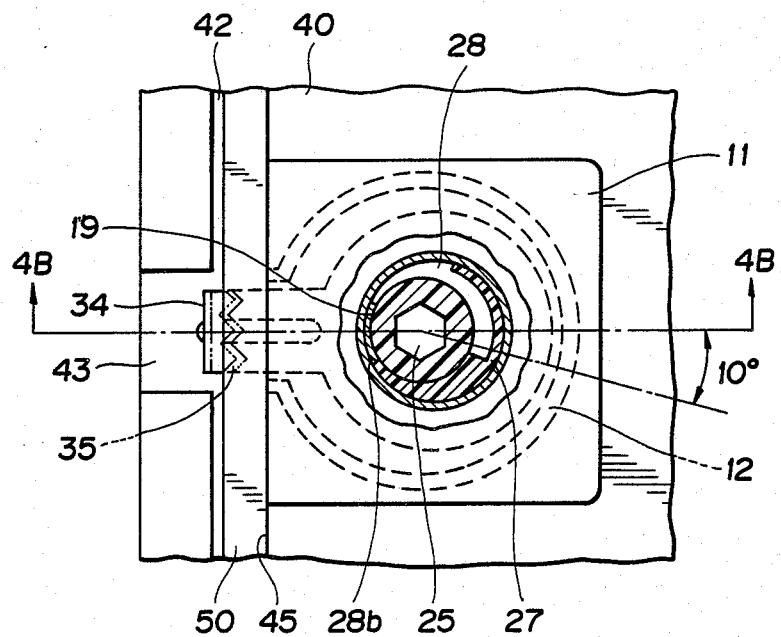
FIG. 4A is a view generally similar to FIG. 3A but showing the inventive device fixing the work material to the base material.

In the arrangement as shown in FIG. 1, the eccentric cam portion 24 of cam 20 is loosely inserted into the engaging portion 32 of the retaining member 30, the disk 22 is urged against the lower edge of the main case 10 while permitting the rotary shaft 21 to be loosely inserted into the circular hole 13, and the engaging ring 26 is brought into engagement with the engaging groove 18. In this arrangement, when the lug 19 is brought into abutment against one end 28a (FIG. 3A) of the stepped groove 28, the retaining member 30 is brought into its maximum advanced (fully extended) position as shown in FIG. 3A, whereas when the lug 19 is brought into abutment against the other end 28b, the retaining member 30 is brought into a position slightly extended from its fully retracted position as shown in FIG. 4A. This is due to the eccentric rotational motion of the outer surface 23 of the cam portion 24 when the rotary shaft 21 is rotated, as discussed below.

Figure 2:
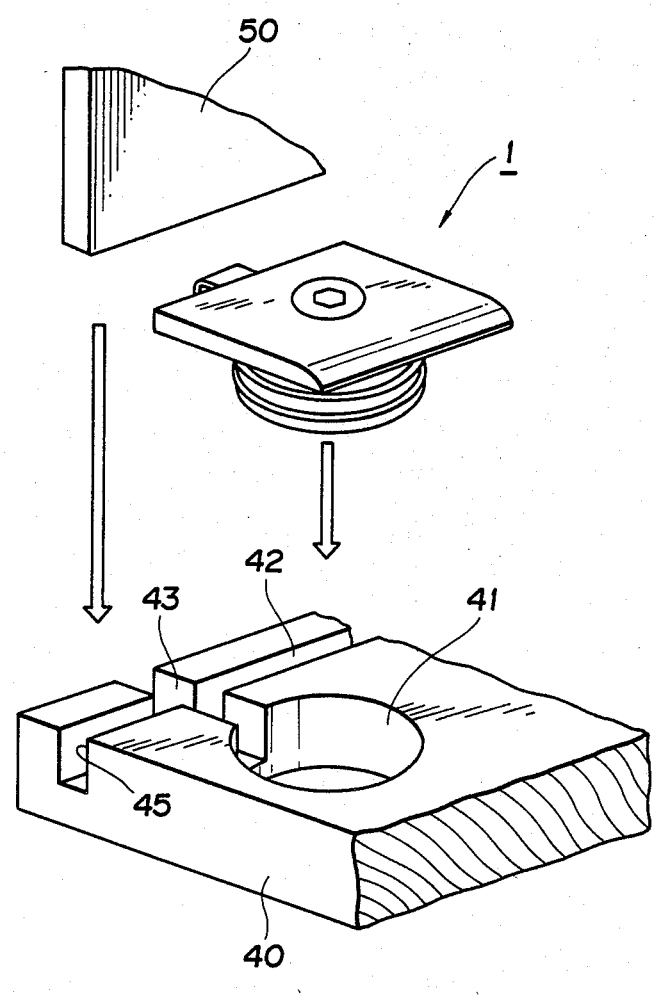
FIG. 2 is a perspective view showing one example of fixing the assembling device, a base material and a work material together.

The assembling device 1, set up in the manner mentioned above, is press fitted with the inner wall of a mounting hole 41 formed in a predetermined position of a base panel 40 as shown in FIG. 2. The base panel 40, as illustrated, is further provided with a mounting groove 42 which extends adjacent the opening 41 and into which a work panel 50 can be inserted, and a guide groove 43 which transversely intersects opening 41 and groove 42 and through which the retaining member 30 of the assembling device 1 is extended and retracted.

When the assembling device 1 has been press fitted with the inner wall of the mounting hole 41, the stepped retaining surface 14 cuts into the base panel 40 and becomes firmly secured thereto as shown in FIG. 3B. The mounting hole 41, mounting groove 42 and guide groove 43 are provided such that a front surface of the projection 16 is in alignment with the illustrated right-hand surface 45 of the mounting groove 42 (FIG. 2) within the guide groove 43. The arm portion 31 of the retaining member 30 can thus move reciprocally through the cut-out 17 to reciprocate the retaining portion 34 in the guide groove 43.

The reciprocal motion of the retaining portion 34 is achieved by rotating the rotary shaft 21 which causes the eccentric cam portion 24 to rotate. As the thickest wall portion 27 of the cam portion 24 (FIG. 1) is rotated toward the guide groove 43 (FIG. 3), the cylindrical engaging portion 32 of the retaining member 30 slides on the cylindrical outer surface 23 of the cam portion 24 since the arm portion 31 extends through the cut-out 17 and prevents rotation of the retaining member 30. The retaining member 30 is thus moved laterally toward the guide groove 43 as the thickest wall portion 27 of the cam portion 24 is rotated toward the guide groove 43. Thus, the arm portion 31 and retaining portion 34 are further extended into the guide groove 43. When the thickest portion 27 is rotated away from the guide groove 43, the retaining portion 34 is retracted toward the main case 10 in similar fashion.

As is shown in FIGS. 3A and 3B, the work panel 50 is inserted into the mounting groove 42. The thickest wall portion 27 of the eccentric cam portion 24 is positioned closet to the guide groove 43 side so that the retaining member 30 is brought to the maximum advanced position at that time.

Figure 4B:
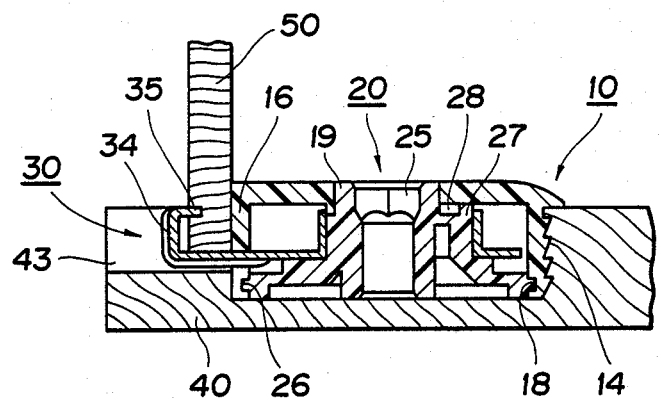
FIG. 4B is a sectional view taken along the line 4B—4B in FIG. 4A.

Next, as a hexagonal wrench (not shown) inserted into the hexagonal hole 25 is rotated clockwise in FIG. 3A, the engaging portion 32, while sliding on the cylindrical outer surface 23, is moved laterally relative to the center axis of the eccentric cam portion 24. As the cam 20 is rotated (through approximately 190°) until the thickest wall portion 27 thereof comes to a position down by 10° from the right-hand side of the line 4B—4B as shown in FIGS. 4A and 4B, the retaining member 30 is first retracted to its fully retracted position (shown by the two dotted chain lines in FIG. 4A), and is then extended a small amount in the advancing direction. At this time, the claw 35 of the retaining member 30 is caused to cut into the work panel 50 and simultaneously, the work panel 50 is pressed against the base panel 40 and held between the projection 16 and the retaining portion 34 of the assembling device 1, whereby the work panel 50 is intimately fixed against the right-hand surface 45 of the mounting groove 42 in the base panel 40. On the other hand, when the hexagonal wrench is reversely rotated (counterclockwise), the cam 20 is returned again to the position shown in FIGS. 3A and 3B and the claw 35 is caused to move out of the work panel 50, thus enabling correction of the mounting position of the work panel 50. The lug 19 thus cooperates with the stepped groove 28 to allow a full range of reciprocal movement and provide convenient rotary adjustment points for assembling and disassembling panels.

As a result of the above-mentioned procedure, the work panel 50 and the base panel 40 can be easily and firmly fixed together by means of the operation of the hexagonal wrench. Particularly, since the claw 35 is caused to cut into the work panel 50 for fixing, the work panel 50 will not be removed even if a force tending to withdraw the same upward (in the direction of the surface of the base material) in FIG. 4B should be applied. In the practice of assembling the furniture, a predetermined number of the assembling devices 1 may be mounted on the base panel 40 at predetermined spaces as necessary. By firmly fixing together the work panel 50 and the base panel 40 in this way, the work panel 50 can be used not only as an ornament but also as a strengthening member, and the base panel 40 and work panel 50 can be assembled rigidly so that no shaking or rattling will occur. Also, a simple rotation of the cam 20 makes it possible to firmly fix the work panel 50 and to release the same for easily correcting the positioning of the work panel 50. Furthermore, by virtue of the provision of the lug 19 and the stepped groove 28, the cam 20 is stopped at a point slightly beyond a change point corresponding to the maximum retracted position of the engaging member 30 when the work panel 50 and the base panel 40 are to be rigidly assembled (i.e. the stop point is slightly over center). Accordingly, even if a force which tends to separate the work panel 50 from the base panel 40 is applied after the two panels are fixed, the cam 20 can only be rotated toward an orientation wherein the retaining portion 34 is further retracted, thus causing an even tighter assembly. Even if compression plywood or a veneer sheet is used as a furniture panel, since the mounting direction of the assembling device 1 and the direction for pressing the work panel 50 are perpendicular to each other, the assembling device 1 is not loosened so as to come off, nor are the work panel 50 and the base panel 40 damaged when assembled.

Although one embodiment of the present invention has been described, the present invention is not in any way limited to this. Many changes and modifications can be made without departing from the spirit of the invention.

Figure 5:
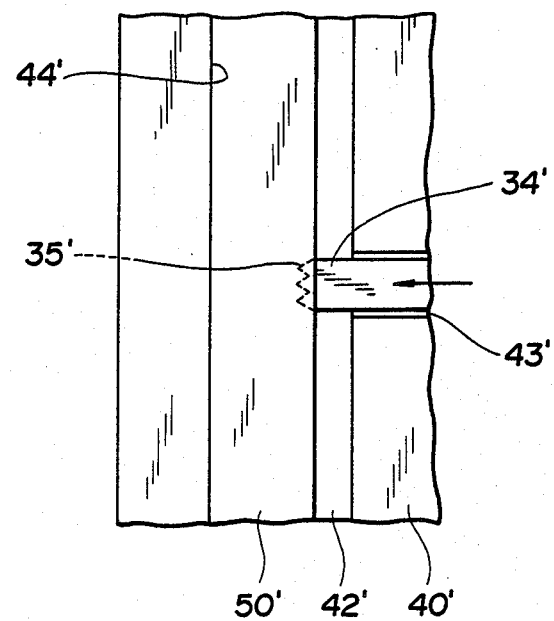
FIG. 5 is a plan view of a portion of a second embodiment of the inventive device.

For example, a sufficient fixing force can be obtained merely by using the retaining portion 34 without the provision of the claw 35. Also, the invention is not limited to a device of the type in which the work panel 50 is drawn toward the main case 10 by the retaining portion 34. Alternatively, as is shown in FIG. 5, a work panel 50 can be fixed and assembled by moving a retaining portion 34' in the direction as shown by the arrow in FIG. 5 within a guide groove 43' so as to intimately urge a work panel 50' against the left-hand surface 44' of a mounting groove 42'. Also, the retaining portion 34' may of course be provided with a claw 35' projecting from the free end thereof as shown by broken lines in FIG. 5 so that the claw 35' will cut into the work panel 50'. The material of the whole assembling device 1 may be metal or otherwise it may be synthetic resin depending on the material of the work panel.

As described in the foregoing, according to the present invention a work panel and a base panel can be simply and rigidly fixed, and the mounting position of the work panel can be corrected with ease. Also, irrespective of the work panel, the work panel and the base panel are not damaged. In addition, generation of noise and occurrence of collapse due to loosening of the assembled panel can be prevented.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A furniture assembling device, comprising:
   a main case adapted for mounting on a first furniture panel;
   a retaining member supported in said main case for reciprocal movement, said retaining member including an engaging portion disposed within said main case and an arm portion projecting from said engaging portion and being extendable away from and retractable toward said main case;
   rotary means rotatably supported in said main case and cooperable with said engaging portion for reciprocating said arm portion between extended and retracted positions; and
   means provided on said arm portion for direct abutment against a second furniture panel, said direct abutment means including said arm portion having a serrated edge formed at a free end thereof and adapted for penetrating engagement with said second panel, said serrated edge facing away from said engaging portion.

2. The device of claim 1, wherein said arm portion has a pressed rib formed therein extending between said engaging portion and said serrated edge.

3. A furniture assembling device for securing first and second platelike panels in generally perpendicular and fixed abutting relationship with one another, said device comprising:
   a first member adapted for fixed securement to said first panel, said first member having an annular casing defining therein a generally cylindrical bore, said casing being adapted for disposition within an opening in said first panel, said casing having an outer peripheral surface provided with gripping means for gripping engagement with said first panel, said casing along having a guide slot extending radially therethrough;
   said first member having a platelike part which is fixedly joined to and extends transversely across one end of said annular casing, said platelike part having a small cylindrical opening extending therethrough in coaxial alignment with said cylindrical bore;
   a second member coaxially rotatably supported within said cylindrical bore for angular displacement relative to said annular casing about the longitudinal axis of said cylindrical bore;
   said second member including a small-diameter cylindrical hub at one axial end thereof and an enlarged diameter cylindrical plate adjacent the other axial end thereof, said cylindrical plate being rotatably supported on said annular casing adjacent the open end thereof, and said small-diameter cylindrical hub being rotatably supported within said small cylindrical opening;
   said second member also including a cam fixedly joined axially between said cylindrical plate and said cylindrical hub, said cam being of cylindrical outer configuration and being radially eccentrically displaced relative to the longitudinal axis of said second member, said cam being positioned within said cylindrical bore in radially inwardly spaced relationship from said annular casing;

a third member interposed generally between said first and second members and being nonrotatably supported relative to said first member and supported for radially displacement relative to both of said first and second members;

said third member including an annular cylindrical support disposed in sliding surrounding relationship to said cam, said third member also having an arm part which is fixed to said annular cylindrical support and which projects radially outwardly through said slot in said casing for a predetermined radial extent, said arm part adjacent a radially outer free end thereof having gripping means for penetrating engagement with said second panel, said opening as formed in said first panel being of a generally cylindrical configuration for receiving therein the annular casing, said first panel also having a first groove formed therein for receiving therein an edge of said second panel to permit said second panel to be positioned in perpendicular but abutting relationship to said first panel, said first groove being positioned closely adjacent but sidewardly spaced from said last-mentioned opening so as to be in nonintersecting relationship therewith, said first panel also having a second groove formed therein which opens radially outwardly from said last-mentioned opening and substantially perpendicularly intersects said first groove, said arm part of said third member projecting outwardly along said second groove so that the gripping means on the free end thereof is positioned for penetrating contact with said second panel.

4. A furniture assembling device according to claim 3, wherein said platelike part extends transversely outwardly beyond the outer periphery of said annular casing and substantially overlies a side surface of said first panel, said cylindrical plate as provided on said second member being snapped into a groove formed interiorly of said annular casing adjacent the open end thereof, and said small-diameter cylindrical hub having tool-engaging means associated with the exposed axial end thereof for permitting engagement with a tool to permit rotation of said second member.

5. A furniture assembling device according to claim 4, including stop means cooperating between said and second members for permitting rotation of said second member relative to said first member through an angular extent which only slightly exceeds 180°.

6. A furniture assembling device according to claim 3, including stop means cooperating between said and second members for permitting rotation of said second member relative to said first member through an angular extent which only slightly exceeds 180°.

* * * * *

UNITED STATES PATENT AND TRADEMARK OFFICE
CERTIFICATE OF CORRECTION

PATENT NO.   : 4,938,625

DATED        : July 3, 1990

INVENTOR(S)  : Kazuhiro MATSUI

It is certified that error appears in the above-identified patent and that said Letters Patent is hereby corrected as shown below:

Column 6, line 41; change "along" to ---also---.

Column 7, line 4; change "radially" to ---radial---.

Column 8, line 18; after "said" insert ---first---.

Column 8, line 23; after "said" insert ---first---.

Signed and Sealed this

Seventh Day of January, 1992

Attest:

HARRY F. MANBECK, JR.

*Attesting Officer*   Commissioner of Patents and Trademarks